United States Patent [19]

Boyd et al.

[11] Patent Number: 4,778,261
[45] Date of Patent: Oct. 18, 1988

[54] METHOD AND APPARATUS FOR NON-FREQUENCY-SHIFTED, PHASE CONJUGATION OF OPTICAL WAVES BY BRILLOUIN-ENHANCED FOUR-WAVE MIXING

[75] Inventors: Robert W. Boyd, Rochester, N.Y.; Paul Narum, Leovenstad, Norway; Mark D. Skeldon, Rochester, N.Y.

[73] Assignee: University of Rochester, Rochester, N.Y.

[21] Appl. No.: 107,189

[22] Filed: Oct. 13, 1987

[51] Int. Cl.⁴ .................. G02B 5/23; G02F 1/01; H01S 3/10
[52] U.S. Cl. .................................. 350/354; 372/21
[58] Field of Search .................... 350/354; 372/21; 356/349

[56] References Cited

U.S. PATENT DOCUMENTS

| | | | |
|---|---|---|---|
| 4,233,571 | 11/1980 | Wang | 372/99 |
| 4,321,550 | 3/1982 | Evtuhov | 330/4.3 |
| 4,390,991 | 6/1983 | Pearson | 372/21 |
| 4,493,086 | 1/1985 | Jain et al. | 372/21 |
| 4,500,855 | 2/1985 | Feinberg | 332/7.51 |
| 4,529,273 | 7/1985 | Golomb | 350/354 |
| 4,573,157 | 2/1986 | O'Meara | 372/20 |

OTHER PUBLICATIONS

A. M. Scott., Opt. Comm., 45, 127 (1983).
Andreev et al., Soviet Phys., Sept Lett., 32, 625 (1980).
Bosov et al., Appl. Phys., 20, 261 (1979).
Efimkov et al., Sov. J. Quant. Elect., 14(2), 209 (1984).
Scott et al., IEEE J. Quant. Elect., QE22, 8, 1248 (1986).

Primary Examiner—Eugene R. LaRoche
Assistant Examiner—Nathan W. McCutcheon
Attorney, Agent, or Firm—Martin LuKacher

[57] ABSTRACT

Method and apparatus for optical phase conjugation, which apparatus is also known as a phase conjugate mirror, utilizes Brillouin enhanced four wave mixing in which a forward going pump wave and a backward going pump wave have frequencis which differ by twice the Brillouin frequency of the medium. The probe wave and the conjugate wave, which is obtained by Brillouin enhanced four wave mixing in the medium, have the same frequency, which differs from the pump wave frequencies by the Brillouin frequency of the four wave mixing medium. High reflectivity (gain) is obtained as a result of Brillouin resonance enhancement. The backward going pump wave is created from the forward going pump wave which is transmitted through the four wave mixing medium by stimulated Brillouin scattering in a Brillouin scattering medium having a Brillouin frequency twice that of the four wave mixing medium. The two pump waves are therefore phase conjugates of each other and the quality of the phase conjugation process is not degraded even by the use of an aberrated pump wave.

19 Claims, 1 Drawing Sheet

METHOD AND APPARATUS FOR NON-FREQUENCY-SHIFTED, PHASE CONJUGATION OF OPTICAL WAVES BY BRILLOUIN-ENHANCED FOUR-WAVE MIXING

DESCRIPTION

The present invention relates to methods and apparatus for producing phase conjugation and providing an output (called a conjugate optical wave or signal) in response to an input optical wave or signal (called the probe wave or signal).

The present invention relates more particularly to an improved method and apparatus for producing phase conjugation by Brillouin-enhanced four-wave mixing.

The invention is especially suitable for use in laser apparatus for reducing aberration of laser beams. More particularly, the invention is especially suitable for providing a phase conjugate mirror wherein a phase conjugate of an input wave is produced which is amplified (the mirror having high reflectivity).

The principal processes for producing phase conjugation are the four-wave mixing process and the stimulated Brillouin scattering process. These processes are described extensively in the technical literature. Reference may be made to the following U.S. patents which discuss one or both of these processes: U.S. Pat. Nos. Wang, et al, 4,233,571 issued Nov. 11, 1980; Evtuhov, 4,321,550 issued Mar. 23, 1982; Feinberg, 4,500,855 issued Feb. 19, 1985; and Golomb, et al, 4,529,273 issued Jul. 16, 1985. This literature contains extensive references to these processes of phase conjugation and discusses the nature of the optical signals (i.e., their polarizations, intensities and interactions in various types of optical media which enable four-wave mixing and stimulated Brillouin scattering to occur).

Another process for phase conjugation is Brillouin-enhanced four-wave mixing. This process is described by A. M. Scott in *Optics Communications*, Volume 45, page 127 (1983), by Andreev, et al, in *Soviet Physics, JETP Letters*, Volume 32, Page 625 (1980), by Basov and Zubarev in Applied Physics, Volume 20, page 261 (1979), by Efimkov, et al, *Soviet Journal of Quantum Electronics*, Volume 14, page 209 (1984), and by Scott et al in *IEEE Journal of Quantum Electronics*, Vol. QE22, No. 8, page 1248 (1986).

High fidelity phase conjugation of optical signals (the probe waves) and which are reflected from the medium as conjugate waves or signals is difficult to obtain in four-wave mixing processes because the pump waves which provide the other two waves in the four-wave mixing medium must be phase conjugates of each other or must be totally unaberrated. In addition, high reflectivity (gain) can ordinarily be obtained only if the wavelengths of the lasers which provide the various waves are chosen so that the nonlinear four-wave mixing medium can be resonantly excited. In stimulated Brillouin scattering (SBS) the energy reflectivity is necessarily less than 100% (attenuation rather than gain occurring in the SBS process). Another disadvantage is that the conjugate wave is frequency shifted with respect to the probe wave. Also SBS is a threshold effect and requires considerable power in the input laser wave.

It is the object of the invention to provide improved methods and apparatus for phase conjugation and especially for phase conjugation based upon Brillouin-enhanced four-wave mixing which has the following advantages: (a) The probe and conjugate waves are at the same frequency; (b) High fidelity phase conjugation occurs even with aberrated pump waves; (c) Reflectivities considerably larger than 100% (e.g. 200%) can be obtained as a result of Brillouin resonance enhancement without a specific resonance requirement on the frequency of the laser which provides the waves to the system; (d) There is no threshold condition for the probe wave.

Briefly described, Brillouin-enhanced four-wave mixing in accordance with the invention utilizes a four-wave mixing medium having a Brillouin frequency ($\Omega$). The medium is pumped by optical pump waves, the frequency of one of which differs from the other by twice the Brillouin frequency. In other words one of the pump waves, $E_1$ has a frequency $\omega$. The other pump wave $E_2$ which counter propagates through the medium has a frequency which differs from the first pump wave $E_1$ by twice the Brillouin frequency and hence its frequency is ($\omega - 2\Omega$). In these equations, the Brillouin frequency, $\Omega$, is related to the optical frequency, $\omega$, by $\Omega = 2n v \omega / c$, where n = refractive index of the medium, v = sound velocity of the medium, and c = velocity of light in vacuum. See W. Kaiser and M. Maier, "Stimulated Rayliegh, Brillouin and Raman Spectroscopy", in Laser Handbook Vol. 2, Edited by F. T. Arrechi and E. O. Schulz-duBois, North Holland Publishers, Amsterdan, Holland (1972) pp. 1078–1150. An aberrated pump wave may be used in accordance with the invention when a stimulated Brillouin scattering medium having a Brillouin frequency equal to twice the Brillouin frequency of the four wave mixing medium is used to generate the backward going pump wave, $E_2$. The probe wave and the resulting conjugate wave may be of the same frequency, differing from the pum wave frequencies by the Brillouin frequency of the four wave mixing medium (the probe wave, $E_3$, having a frequency ($\omega - \Omega$) and the conjugate wave, $E_4$, having a frequency ($\omega - \Omega$).

The foregoing and other objects and advantages of the invention, as well as a presently preferred embodiment thereof and the best mode presently known for carrying out the invention, will become more apparent from the reading of the following description in connection with the accompanying drawings and also from a reading of an article by the inventors hereof entitled, Non-Frequency-Shifted, High-Fidelity Phase Conjugation With Aberated Pump Waves By Brillouin-Enhanced Four-Wave Mixing, *Optics Letters*, Vol. 12, page 343, May 1987 and from an article soon to be published in the *IEEE Journal of Quantum Electronics*, a copy of which is attached to this Application, the IEEE Journal article discussing the mathematical basis of the process in accordance with a theoretical basis (Applicants' invention not being limited to any theoretical basis or theory of operation).

In the drawings of this Application:

The above-identified articles by Applicants are incorporated by reference as though they were reproduced in their entirety herein. These articles provide a specific example of the best mode now known for carrying out the invention.

Figure 1:
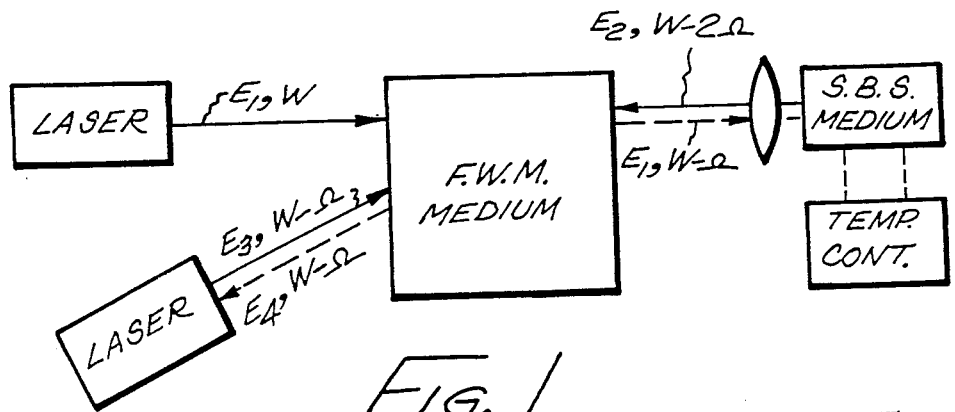
FIG. 1 is a block diagram of a phase conjugation system in accordance with the invention.

In FIG. 1 there is shown a laser which generates the pump beam $E_1$ along an optical path through a four-wave mixing medium. Various nonlinear media may be used and several are described in the technical literature referenced above. The specific frequency ($\Omega$) of the pump wave depends upon the frequency of the probe wave which is obtained from another laser. This probe wave is indicated as $E_3$ and has a frequency ($\omega - \Omega$), where ($\Omega$) is the Brillouin frequency of the four-wave mixing medium. It will be noted that the path of the pump wave $E_1$ and the path of the probe wave $E_3$ are at an acute angle with respect to each other so as to provide for the largest coupling path so as to enhance the efficiency of four-wave mixing in the medium. The medium may, of course, be arranged in a cell having transparent sides through which the optical waves may be passed.

The conjugate wave $E_4$ counter propagates colinearly with the probe wave. It is shown in dash lines side by side with the probe wave to simplify the illustration. This conjugate wave will be the phase conjugate of the probe wave and be at the same frequency, ($\omega - \Omega$).

The other pump wave $E_2$ is the backward going pump wave and is counterpropagating along the same optical path through the medium as the first mentioned or forward going pump wave $E_1$. In accordance with the invention, the backward going pump wave has a frequency which differs from the forward going pump wave by twice the Brillouin frequency ($2\Omega$) from the forward going pump wave. As explained in the above-referenced articles by the inventors hereof, this results in a conjugate wave which is not shifted in frequency with the input probe wave and also high reflectivity (gain) in the four-wave mixing process which is ongoing in the four-wave mixing medium.

In order to generate the backward going pump wave and to enable the use of pump waves which are aberrated, the backward going pump wave is generated as the phase conjugate of the forward going pump wave by stimulated Brillouin scattering in a stimulated Brillouin scattering medium. This SBS medium may be confined in a cell which is along the optical path of the forward going pump wave. Accordingly, the forward going pump wave which is transmitted through the four-wave mixing medium and is shown by the dashed lines is focused into the SBS medium by a lens. It will be appreciated that the transmitted forward going pump wave and the backward going pump wave $E_2$, are colinear, their separation being shown merely for the sake of illustration. The SBS medium has a Brillouin frequency of twice the Brillouin frequency of the four-wave mixing medium or $2\Omega$. Accordingly, the backward going pump wave $E_2$ will have a frequency ($\omega - 2\Omega$). Because the backward going pump wave is generated by a stimulated Brillouin scattering process it is the phase conjugate of the forward going pump wave.

The Brillouin frequency of the SBS medium may be controlled by controlling the temperature of the medium in its cell. A temperature controller with a conventional heating element and thermostat may be used for this purpose.

The theory of operation of the system is fully explained in the above-referenced articles by Applicants, as discussed above.

Figure 2:
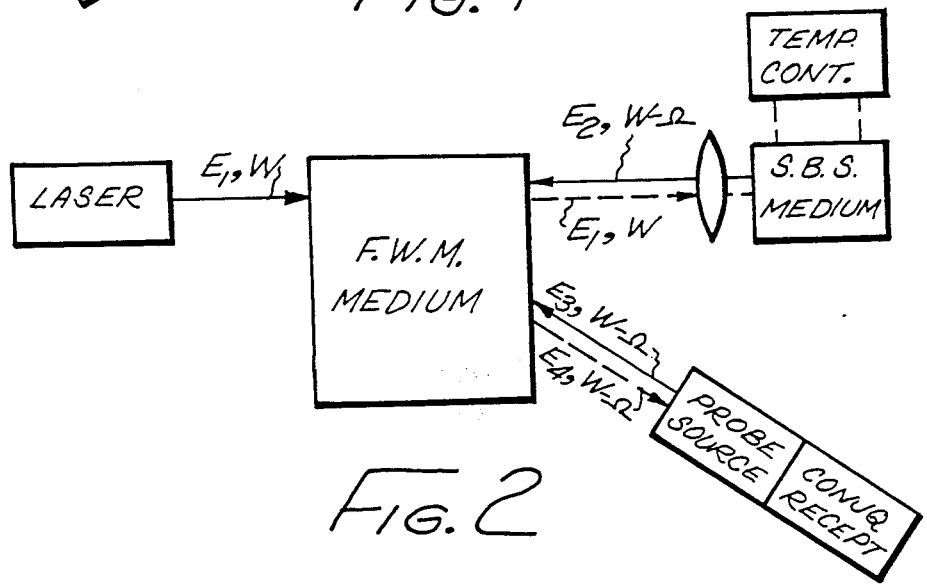
FIG. 2 is a block diagram of a system similar to FIG. 1 but in accordance with another embodiment of the invention.

Referring to FIG. 2, it will be observed that the system is similar to that shown in FIG. 1 except that the probe source (e.g., the laser) and the conjugate receptor are disposed along an optical path on the backward side of the four-wave mixing medium. This optical path also makes an acute angle, for example the same acute angle as the path of the probe and conjugate beams shown in FIG. 1.

Figure 3:
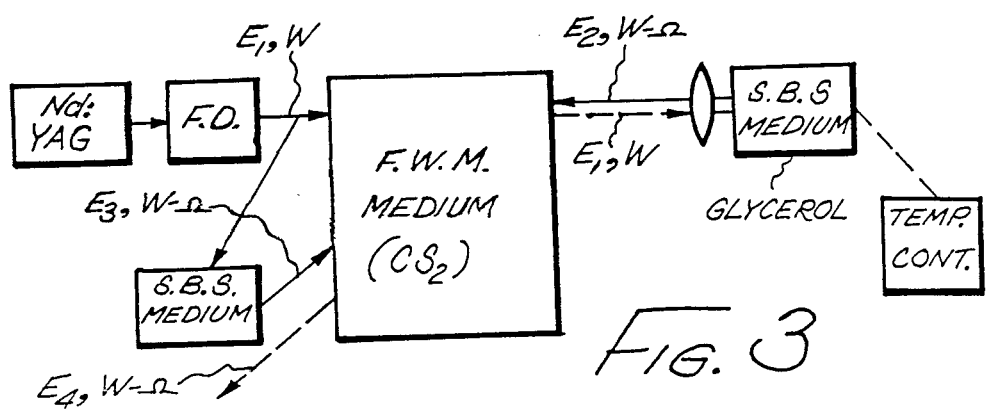
FIG. 3 is a block diagram of still another embodiment of the invention.

FIG. 3 shows the system in the form illustrated in FIG. 1 with the following differences, the probe wave is generated by an SBS medium in a cell to which the pump beam is directed; and the pump beam is generated by an Nd:YAG laser and a frequency doubler (FD). The pump wave may be coupled by a conventional optical coupler (a partially reflecting mirror, for example) to the probe wave generating SBS cell. This SBS cell has a Brillouin frequency equal to $2\Omega$, $\Omega$ being the Brillouin frequency of the four-wave mixing medium. In practice, the same material may be used in the four-wave mixing cell and the probe generation SBS cell.

The four-wave mixing medium used in accordance with the embodiment of the invention shown in FIG. 3 is carbon disulfide ($CS_2$). The SBS medium which is shown as in FIG. 2 having the focusing lens at the front end of the cell, is suitably glycerol. Its temperature is controlled by temperature controller, TC, so that the backward going wave $E_2$ will differ in frequency from the forward going wave by twice the Brillouin frequency of the four-wave mixing medium. The output or conjugate wave is derived from the four-wave mixing medium. A diverting, partially reflecting mirror (not shown) or other conventional means may be used to extract the conjugate wave.

From the foregoing description it will be apparent that there has been provided an improved phase conjugate mirror system (method and apparatus). Variations and modifications in the herein-described System, within the scope of the invention, will undoubtedly suggest themselves to those skilled in the art. Accordingly, the foregoing description should be taken as illustrative and not in a limiting sense.

We claim:

1. In the method of Brillouin-enhanced four-wave mixing in a four-wave mixing medium having a Brillouin frequency, the improvement comprising the steps of pumping said medium with optical pump waves one of which differs in frequency from the other by a frequency which is essentially twice the Brillouin frequency of said medium, applying a probe wave to said medium which differs in frequency from said pump waves, and obtaining a wave which is a phase conjugate of said probe wave and at the same frequency as said probe wave from said medium.

2. The method according to claim 1 further comprising directing said pump waves such that they are in counterpropagating directions in said medium, directing said probe waves such that it propagates into said medium at an acute angle to the direction of one of the pump waves.

3. The method according to claim 2 further comprising generating one of said counterpropagating pump waves by stimulating Brillouin scattering of the other of said pump waves.

4. The method according to claim 3 further comprising deriving one of said pump waves for generation of said other pump wave after transmission of said one pump wave through said medium.

5. The method according to claim 4 wherein said generating step is carried out by stimulated Brillouin scattering in a Brillouin scattering medium having a Brillouin frequency of twice the Brillouin frequency of said four-wave mixing medium.

6. The method according to claim 5 further comprising controlling the frequency of said Brillouin scattering medium so that its Brillouin frequency is at said frequency of twice the Brillouin frequency of said four-wave mixing medium.

7. The method according to claim 6 wherein said frequency controlling step is carried out by controlling the temperature of said Brillouin scattering medium.

8. Apparatus for producing an optical conjugate wave which is the phase conjugate of an optical probe wave and is also not frequency shifted with respect to said probe wave, said apparatus comprising a four-wave mixing medium having a Brillouin frequency, means for applying to said medium first and second pump waves which differ in frequency by twice said Brillouin frequency, means for applying to said medium as said probe wave an optical wave having a frequency which differs from said pump wave frequencies by the Brillouin frequency of said medium whereby to produce said conjugate wave propagating from said medium in a direction opposite to the direction of said probe wave.

9. The apparatus according to claim 8 wherein said applying means comprises means for directing said pump waves into said medium so that they are counter-propagating therein one propagating in a forward going and the other in a backward going direction in said medium.

10. The apparatus according to claim 9 wherein said probe wave applying means includes means for directing said probe wave into said medium at an acute angle with respect to said forward or said backward pump waves.

11. The apparatus according to claim 9 further comprising means for generating said backward pump wave by stimulated Brillouin scattering from said forward pump wave which has been transmitted through said medium.

12. The apparatus according to claim 11 wherein said backward pump wave generating means comprises a Brillouin scattering medium having a Brillouin frequency tWice the Brillouin frequency of said four-wave mixing medium and disposed in the path of said forward pump wave which has been transmitted through said medium.

13. The apparatus according to claim 12 wherein said generating means further comprises means for focusing said forward pump wave which has been transmitted through said four-wave mixing medium into said Brillouin scattering medium.

14. The apparatus according to claim 12 further comprising means for controlling the Brillouin frequency of said Brillouin scattering medium to be at essentially twice the Brillouin frequency of said four-wave mixing medium.

15. The apparatus according to claim 13 wherein said controlling means comprises means for controlling the temperature of said Brillouin scattering medium.

16. The apparatus according to claim 12 wherein said four-wave mixing medium is a first Brillouin active material and said Brillouin scattering medium is a second Brillouin active material.

17. The apparatus according to claim 16 wherein said first material is $CS_2$ and said second material is glycerol.

18. The apparatus according to claim 12 wherein said four-wave mixing medium and said Brillouin scattering medium are contained in cells disposed along an optical path from a laser which generates said forward pump wave.

19. The apparatus according to claim 9 wherein a cell is provided containing said four-wave mixing medium, another cell containing a Brillouin scattering medium having a Brillouin frequency twice that of said four-wave mixing medium, said applying means comprising means for directing said forward pump wave into both of said cells whereby said backward pump wave is generated in said cells containing said Brillouin scattering medium and reflected into said cell containing said four-wave mixing medium.

* * * * *